June 15, 1971  E. J. SOLTYSIK  3,584,348
SPRING CLIP
Filed Feb. 4, 1970  2 Sheets-Sheet 1
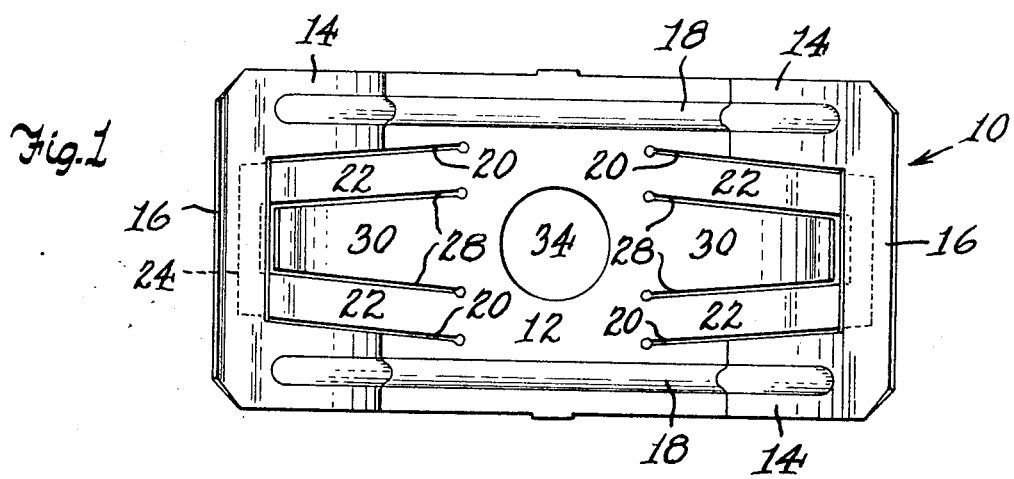
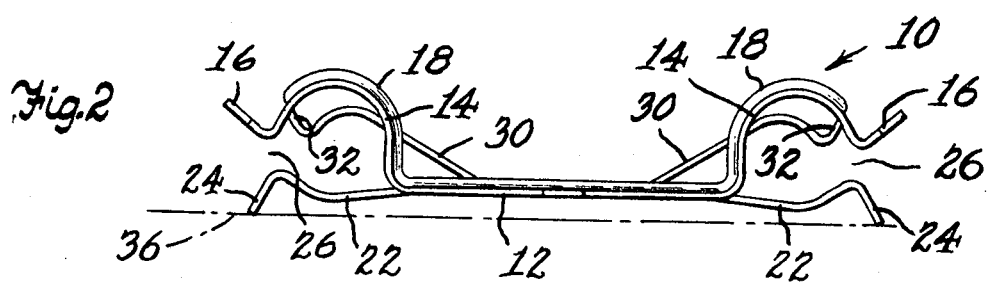
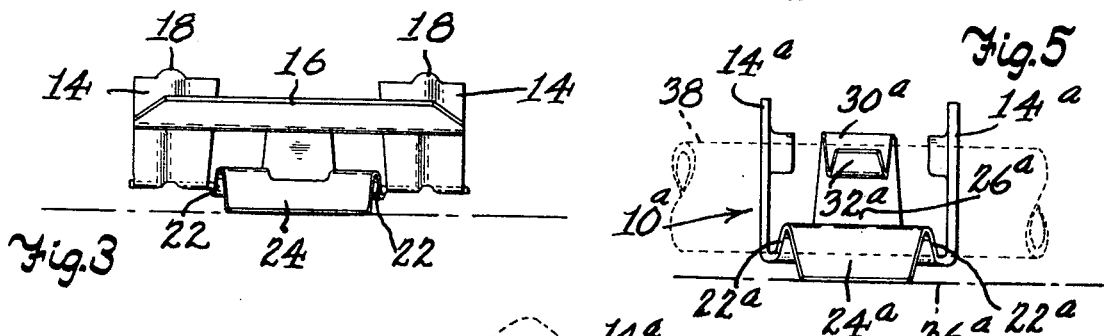
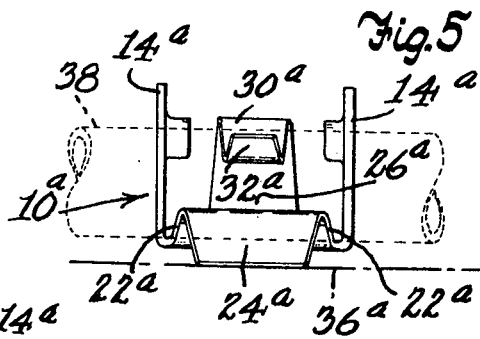
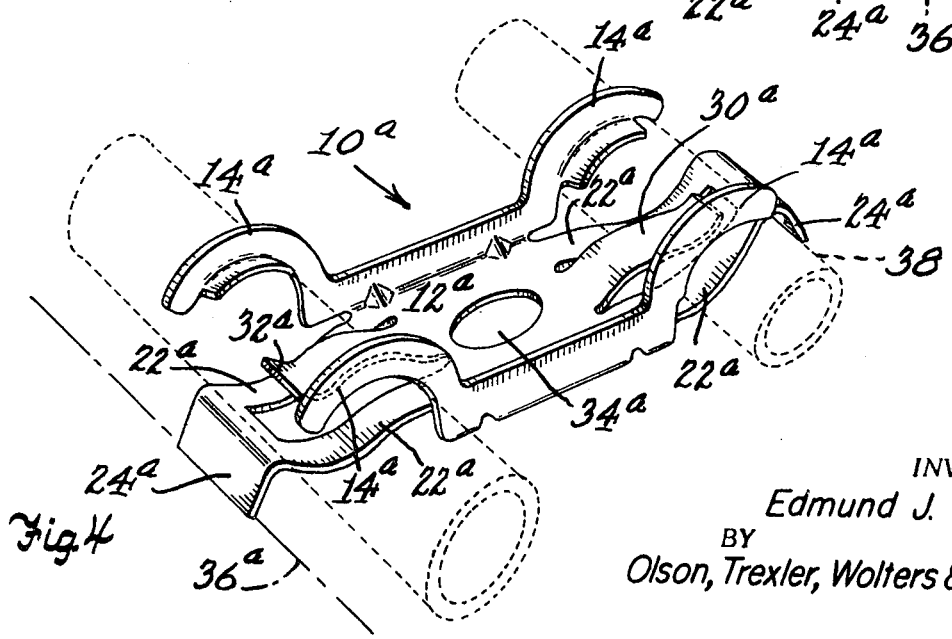
INVENTOR.
Edmund J. Soltysik
BY
Olson, Trexler, Wolters & Bushnell
Att'ys

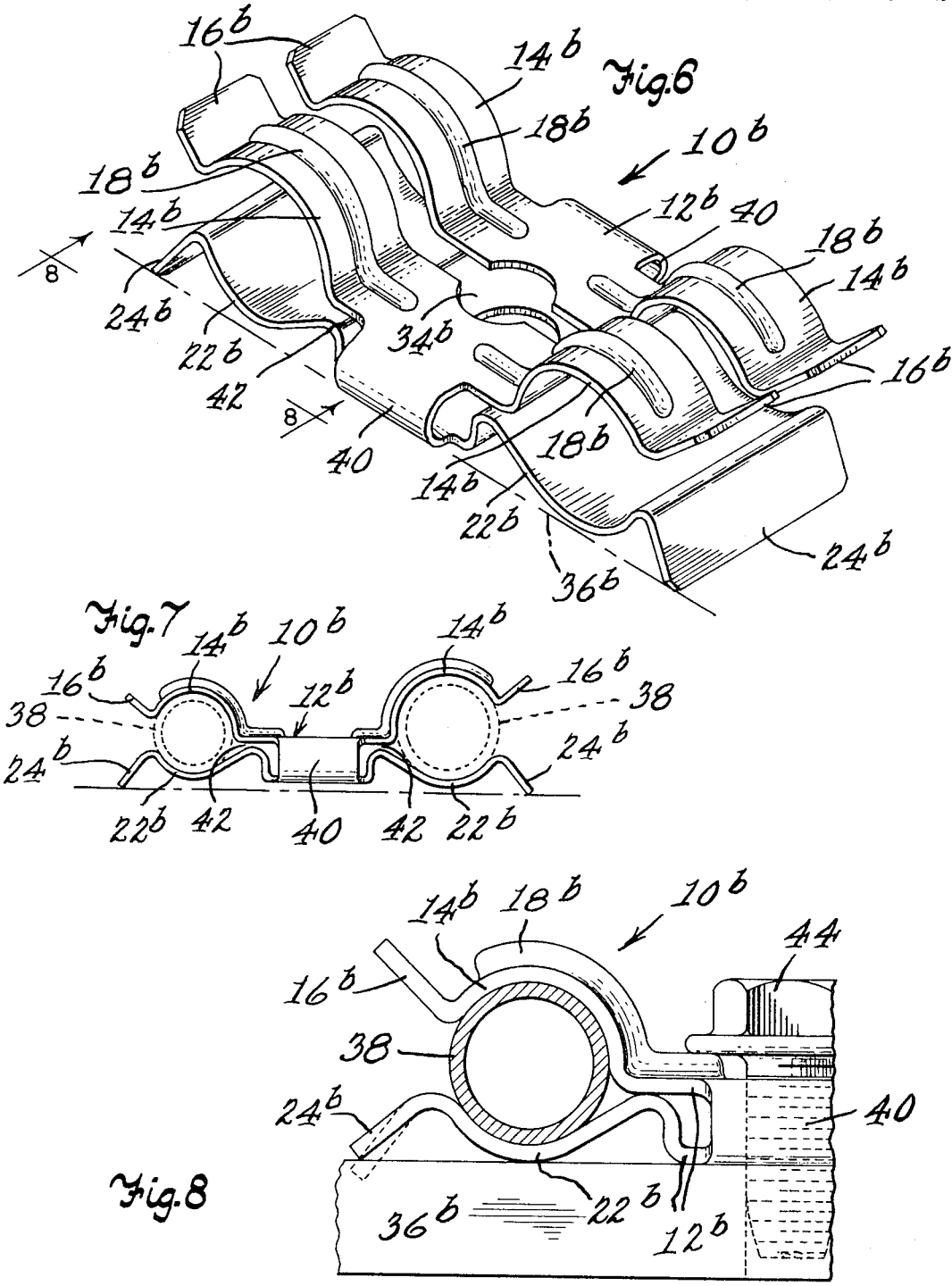

United States Patent Office 3,584,348
Patented June 15, 1971

3,584,348
SPRING CLIP
Edmund John Soltysik, Chicago, Ill., assignor to
Illinois Tool Works Inc., Chicago, Ill.
Filed Feb. 4, 1970, Ser. No. 8,487
Int. Cl. F16l *3/02;* F16b *17/00*
U.S. Cl. 24—81CC  9 Claims

ABSTRACT OF THE DISCLOSURE

The present invention relates generally to spring clips for accommodating elongate members such as conduits, cables and the like, and more particularly to double ended type clips having fingers for gripping opposite sides of elongate workpieces. One embodiment of the present invention disclosed herein includes a generally plate-like body section adapted to be clamped against a supporting work surface as by means of a screw member, and a pair of laterally yieldable fingers integral with and extending from opposite margins of said central body for impinging opposed sides of elongate workpieces. Integral lip portions diverge from the extremities of said fingers and extend laterally beyond the general central plane of the body, whereby upon movement of the body toward an associated mounting surface the workpiece impinging aggressiveness of the fingers will be materially increased.

It is an object of the present invention to provide an improved and extremely practical sheet metal spring clip for accommodating a pair of elongate workpieces, and upon being tightened against a supporting work surface the gripping aggressiveness of the clip against said workpieces will be increased.

More specifically, the invention contemplates a spring clip of the type referred to above which lends itself structurally for stamping and forming from sheet metal stock.

It is a further object of the present invention to provide a unique form of spring clip which is especially designed to accommodate with equal facility and impinging aggressiveness, elongate workpieces or conduits of different diameters.

The invention contemplates provision of a novel and efficiently operable clip device which is structurally arranged to permit lateral initial gripping association of elongate workpieces therewith, and after the clip has properly positioned along said workpieces and tightened against a supporting work surface, the final gripping impingement will increase sufficiently to secure the elongate workpieces permanently within the clip.

The foregoing and other objects and advantages will be more apparent from the following detailed description when considered in connection with the accompanying drawings wherein:

FIG. 1 is a plan view of one embodiment of a spring clip of the type contemplated by the present invention;

FIG. 2 is a side elevational view of the clip illustrated in FIG. 1;

FIG. 3 is an end elevational view of the spring clip shown in FIGS. 1 and 2;

FIG. 4 is a perspective view of a modified form of spring clip of the type contemplated by the present invention;

FIG. 5 is an end view of the clip and associated elongate workpiece shown in FIG. 4;

FIG. 6 is a perspective view of a still further modified form of spring clip;

FIG. 7 is a reduced side elevational view of the clip shown in FIG. 6, with elongate workpieces in association therewith, said clip being shown prior to the final clamping thereof against a work surface; and, FIG. 8 is an enlarged side elevational view of the left portion of the clip as shown in FIG. 6, after said clip has been finally tightened against a work member, said view being taken substantially along the line 7—7 of FIG. 6.

Referring now to the drawings more in detail wherein like numerals have been employed to designate similar parts throughout the various figures, it will be seen that one embodiment contemplated by the present invention is disclosed in FIGS. 1 to 3, inclusive and is designated generally by the numeral 10. The clip 10 includes a central plate-like sheet metal body section 12 of single thickness. Extending from and integral with opposite margins of the body 12 are pairs of fingers or arms 14 connected at their outer extremities by a transverse lip section 16. The free extremity of each of the fingers or arms 14 are shaped to conform with the peripheral contour of elongate workpieces such, for example, as conduits. The lips 16 extend laterally outwardly as shown clearly in FIG. 2. It will be noted that the fingers 14 are longitudinally embossed so as to present reinforcing ribs 18. These ribs 18 serve to increase resistance of the yieldable arms or fingers to undesirable distortion.

The inner longitudinal margins of the fingers 18 are separated by slots 20 from a second pair of fingers 22. One extremity of these fingers 22 is formed integral with the margin of the plate-like body section 12 and the free extremities thereof are connected by an integral transverse lip 24. It will be seen that the lips 24 diverge laterally from the general plane of the plate-like body 12 and that the outer terminal edges of these lips 24 normally occupy a position spaced laterally beyond the plane of the body 12. The lips 16 and 24 flare away from each other and provide a space 26 therebetween to facilitate lateral insertion of elongate workpieces.

Positioned intermediate the fingers 22 and separated therefrom by slots 28 are fingers 30 extending from opposite margins of the body 12. As will be seen from FIG. 2, the fingers 30 are inclined outwardly from the plane of the body 12 to a point in substantial axial alignment with the space defined by the free extremities of the arms 22. The free extremity of each of the arms 30 is formed with a diverging lip 32, and said free extremities occupy a position closer to the plane of the fingers 22 than do the free extremities of the fingers 14. Thus the free extremities of the fingers 32 are designed to receive and impinge workpieces of lessor diameter than would normally be initially accommodated by the free extremities of the fingers or arms 22.

In using the clip device just described workpieces may be moved laterally between the free extremities of the fingers and then the clip device may be shifted along the workpieces so as to occupy the desired location with respect thereto. An aperture 34 in the central body section 12 is adapted to receive a suitable fastening member such as a screw (not shown). The clip is now applied to the mounting surface of a workpiece 36 indicated by the dot and dash line in FIG. 2. Initially, the edges of the lips 24 rest upon the work surface and the body section is spaced therefrom. As the screw is tightened so as to move the body section 12 toward and ultimately into contact with the work surface 36, the fingers 22 are forced upwardly.

This results in increasing the workpiece impinging aggressiveness of the fingers. Should the workpiece be of relatively small diameter the free extremities of the fingers 30 and 22 will more aggressively impinge the workpiece. Elongate workpieces of larger diameter will be gripped with increased pressure between the free extremities of the fingers 14 and 22.

FIGS. 4 and 5 disclose an alternative spring clip contemplated by the present invention, said clip being designated generally by the numeral 10a. The clip 10a includes a central plate-like body section 12a and pairs of fingers 14a extending from opposite margins and formed integral with the body section 12a. The outer extremities of the arms 14a terminate in outwardly reflected lips 16a. The only significant structural difference between the fingers 14a and the previously described fingers 14, is that the fingers 14a are formed from stock which is deflected edgewise so as to increase the strength of the fingers against forces tending to move said fingers laterally with respect to the body portion 12a. In all other respects the fingers 14a function similarly to the previously described fingers 14.

Pairs of fingers 22a are structurally and functionally similar to the previously described fingers 22. The fingers 22a are connected by a transverse lip 24a which is deflected oppositely from the lips 16a. Interposed between each pair of fingers or arms 22a is a finger 30a having a deflected lip 32a. The fingers 30a are structurally and functionally similar to the previously described fingers 30 in FIGS. 1 to 3, inclusive. The body section 12a is provided with a screw accommodating aperture 34a. Space 26a presented between the free extremities of the lips 16a and 24a is adapted to receive elongate workpieces 38 shown by dotted lines in FIGS. 4 and 5. The work surface against which the terminating edges of the lips 24a rest is indicated by a dot and dash line 36a. In FIG. 5 the clip 10a is shown just prior to the final clamping of the central plate like section 12a thereof against the work surface 36a.

A further modified form of double ended spring clip contemplated by the present invention is shown in FIGS. 6 to 8 inclusive. This clip is designated generally by the numeral 10b. The clip device 10b includes a central plate-like body section 12b. Unlike the corresponding previously described body sections 12 and 12a, the body section 12b is comprised of upper and lower plate portions which are maintained in spaced relation with respect to each other by integral spacer elements 40. Fingers 14b formed integral with and extending from opposite margins of the body section 12b are formed at their outer extremities with lips 16b. It will be apparent that these fingers 14b function similarly to the previously described fingers 14 and 14a of the clip devices 10 and 10a respectively. The fingers 14b, are embossed so as to provide reinforcing or strengthening ribs 18b similar in structure and function to the previously described ribs 18. Fingers 22b, together with their lip portions 24b, extend from the opposite margins of the lower portion of the clip body 12b. These fingers 22b function similarly to the previously described fingers 22 and 22a. The clip 10b differs structurally from the previously described clips in the elimination of the medial fingers 30 and 30a.

It will be aparent from the foregoing that when the terminal edges of the lips 24b initially engage a work surface 36b represented by the dot and dash line FIG. 7, the central body portion 12b will be spaced upwardly from the work surface. A space 42 also is present between the fingers 14b and 22b adjacent the margin of the central body section 12b. As the body section 12b is urged toward the supporting work surface 36 through the agency of a screw member 44 shown in FIG. 8, the free extremities of the fingers 22b are urged into greater impingement with the elongate workpieces 38. In the final tightened position of the clip 10b against the work surface, the outer surface of each finger 22b will engage the work surface as shown in FIG. 8, and the portion of the fingers 14b and 22b in the vicinity of the body margin close the space or gap 42 and provide a strut or limiting abutment as shown. In this manner the complete collapsing of the fingers in the vicinity of the body margins is precluded.

From the foregoing it will be apparent that the present invention contemplates the provision of a very simple, yet practical device for securing or positioning elongate workpieces of various types. Spring clips constructed in accordance with the teachings of the present invention may be produced from sheet metal stock by the practice of conventional stamping and forming methods. By having the clips structurally designed so that the workpieces may be initially associated therewith by lateral insertion between the flaring lips of the spring fingers the ease of assembly is greatly facilitated. Also by having the clips so arranged that the initial impingement of the fingers with the workpieces is sufficient to hold them in place and at the same time permit relative adjustment of the clip axially with respect to the workpieces. The novel arrangement of the lips on the fingers adjacent the work surface assures the required increase in impingement aggressiveness upon the elongate workpieces when the clip is finally tightened against the mounting surface.

What is claimed is:

1. A double ended clip for accommodating elongate workpieces such as conduits, cables and the like, including a central plate-like body section adapted to receive a fastener such as a screw member for clamping said body against a mounting surface, a pair of laterally yieldable fingers integral with and laterally yieldable with respect to said body, said fingers extending from opposite margins of said central body and having free extremities normally positioned beyond the general plane of the body for impinging one of the sides of associated elongated workpieces, additional laterally yieldable fingers extending from opposite sides of the body margins for impinging the opposite sides of said workpieces, and integral lip portions diverging from the extremities of said last mentioned fingers and extending laterally beyond the general plane of said body, whereby upon movement of said body toward an associated mounting surface following the initial engagement of said surface by said lip diverging portions, the workpiece impinging aggressiveness of said fingers will be increased.

2. A double ended clip for accommodating elongate workpieces as set forth in claim 1, wherein each finger includes an arm section having one extremity connected to said margin and a free extremity shaped in conformity with the workpieces to be accommodated thereby.

3. A double ended clip for accommodating elongate workpieces as set forth in claim 1, wherein the fingers include a pair extending from one margin of the body and a pair extending from the opposite margin of the body, the free extremities of said fingers being positioned beyond the same side of the body plane.

4. A double ended clip for accommodating elongate workpieces as set forth in claim 1, wherein the fingers include pairs of fingers extending from opposite margins of the body, and additional fingers extending from said opposite margins and positioned intermediate said first mentioned fingers.

5. A double ended clip for accommodating elongate workpieces as set forth in claim 1, wherein the body section comprises a single thickness of sheet metal stock.

6. A double ended clip for accommodating elongate workpieces as set forth in claim 1, wherein the body section includes a pair of adjacently spaced plate section, fingers extending from opposite sides of one body section having extremities adapted to engage one side of an associated elongate workpiece, and fingers extending from opposite margins of the other body section having free extremities for engaging the opposite sides of said associated elongated workpiece.

7. A double ended clip for accommodating elongate workpieces as set forth in claim 1, including additional fingers extending from opposite margins of said central body, the free extremities thereof cooperatively disposed with respect to the free extremities of certain of the previously mentioned fingers to provide spaces for impingingly accommodating elongate workpieces of lesser thickness than the workpieces adapted to be impinginly accommodated by the first mentioned fingers.

8. A double ended clip for accommodating elongate workpieces as set forth in claim 7, wherein said additional fingers extend from opposite margins of the body section from areas intermediate the other fingers.

9. A double ended clip for accommodating elongate workpieces as set forth in claim 7, wherein all of the fingers are provided with diverging lips at their free extremities to facilitate initial, lateral insertion of elongate workpieces.

References Cited

UNITED STATES PATENTS

| | | | |
|---|---|---|---|
| 361,153 | 4/1887 | Finks | 24—73SAUX |
| 1,759,781 | 5/1930 | Fontannaz | 24—81CCUX |
| 2,061,463 | 11/1936 | Hall | 248—73 |
| 2,390,750 | 12/1945 | Tinnerman | 85—36 |
| 2,440,469 | 4/1948 | Goddard | 248—68 |
| 3,068,924 | 12/1962 | Summers | 151—41.7 |
| 3,441,986 | 5/1969 | Pritchard | 24—73SA |

FOREIGN PATENTS

| | | | |
|---|---|---|---|
| 1,099,326 | 3/1955 | France | 248—68 |

DONALD A. GRIFFIN, Primary Examiner

U.S. Cl. X.R.

248—68